Figure 1:
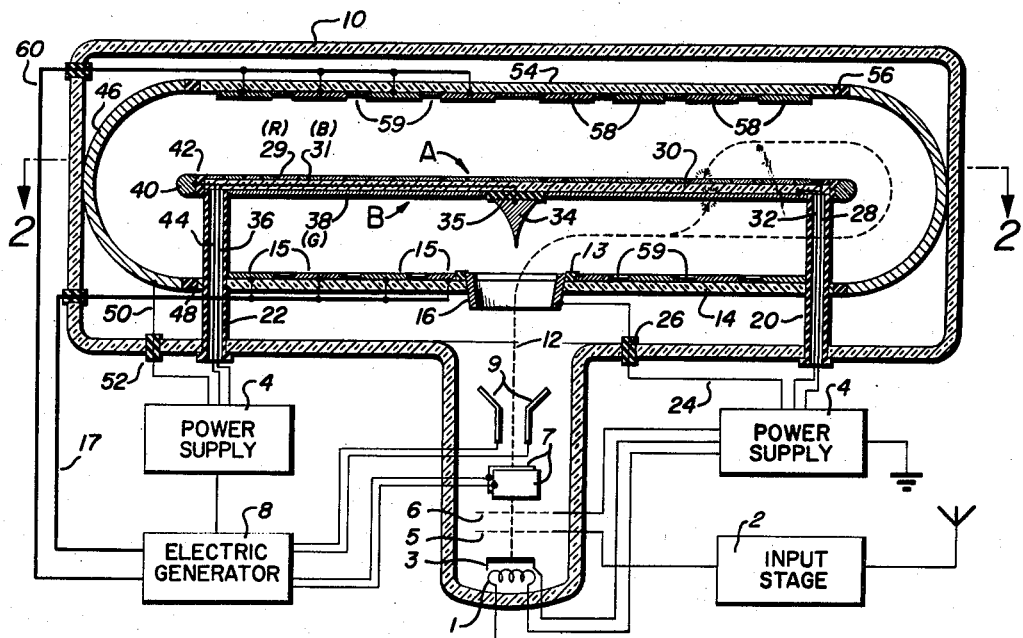

July 21, 1959    W. R. AIKEN    2,896,111
ELECTRONIC DEVICE
Filed May 1, 1956    3 Sheets-Sheet 1

INVENTOR
William Ross Aiken
BY James E. Toomey
ATTORNEY

July 21, 1959 W. R. AIKEN 2,896,111
ELECTRONIC DEVICE
Filed May 1, 1956 3 Sheets-Sheet 2

INVENTOR
William Ross Aiken
BY James E. Toomey
ATTORNEY

INVENTOR
William Ross Aiken

United States Patent Office 2,896,111
Patented July 21, 1959

2,896,111

ELECTRONIC DEVICE

William Ross Aiken, Los Altos, Calif., assignor, by mesne assignments, to Kaiser Industries Corporation, a corporation of Nevada Application May 1, 1956, Serial No. 582,032

6 Claims. (Cl. 315—21)

This invention relates to a cathode-ray tube and more particularly to a polar coordinate cathode-ray tube structure capable of exhibiting an image display in color.

Polar coordinate tubes of the type known in the prior art have particular application in their use as so-called memory or storage tubes. In such use, the tubes are primarily adapted to store a clear, distinct image from one scan to another whereby it is possible to simultaneously visually compare several sets of signals on the target. Storage tubes have been particularly successful in their use in electronic navigational aids for pilots (aircraft cockpit weather mapping), television film conversion, radar scan conversion, digital and analog computers, moving target indication radar and band width reduction.

Many of these applications require a tube which is of small and compact structure. A particular example of such problem is evidenced in the utilization of such a tube in electronic navigational aids for aircraft use.

The advent of radar navigational systems for use in aircraft has brought about a tremendous number of advantages enabling the pilot to be visually cognizant of objects in the region of the aircraft, such as mountains, other aircraft, and prominent structures. Among the ever present problems in present high velocity aircraft is the combination of the necessary navigational equipment components and the requisite space necessary to house the equipment. The design of the present day high velocity aircraft is dictated by the physics of aerodynamics which demands exceedingly smaller cross-sectional contours in order to obtain the required streamlining for decreasing the wind resistance or drag, thereby increasing the potential velocity of the aircraft. Manifestly, the decreased cross-sectional dimensions of the aircraft have necessitated that the equipment for operating and navigating the aircraft be positioned within a correspondingly more compact space.

The conventional cathode-ray tube utilized in conventional radar systems for navigation has presented a rather insurmountable problem. In order to reduce the longitudinal dimensions of the tube, a corresponding reduction must be made in the diameter of the fluorescent viewing area of the tube. Attempts have been made in the prior art to reduce the length of the dimension from the electron gun to the fluorescent image screen in an effort to decrease the overall space requirements for the conventional cathode-ray tubes. However, one of the problems introduced thereby is the fact that in decreasing the gun-to-screen dimension, it has become necessary to curve the image screen so that the length of travel of the electrons from their source to the various portions of the screen to be impinged are substantially equal throughout the entire scanning procedure in order to present an undistorted representation on the screen. Manifestly, if a very large image screen were required, it would have to be curved a considerable amount, thereby resulting in a tube shape of awkward and cumbersome configuration.

With the knowledge of these disadvantages, the inventor has produced a polar coordinate cathode-ray tube which has overall dimensions considerably smaller than the dimensions of the known types of cathode-ray tubes, yet is still capable of energizing an equally large image screen as utilized by the conventional tube.

Color is a most satisfactory method of conveying more information to air traffic controllers and other persons involved in air navigation than is possible with ordinary black and white cathode-ray tubes used in conventional radar systems. One employment of polychrome presentation would be to display aircraft positions in various colors, such as, for example, red, green and blue. The significance of the various color aircraft designation, as represented by "blips" of that color on the image or display screen, would be that the pilot and/or traffic man could ascertain which planes were at the odd altitude and which at the even altitude. For traffic control reasons, aircraft have to be assigned definite altitudes to keep the airways free from congestion. Manifestly, there are many other commercial uses in which a polychroms polar coordinate tube could be advantageously utilized.

An embodiment of the invention contemplates a polychrome polar coordinate tube comprising an evacuated envelope and an optically transparent electrically conducting target electrode disposed therewithin having one surface thereof coated with a fluorescent material capable of emitting light of one color and the other side coated with concentric annuli of fluorescent material capable of emitting two other colors when excited by an impinging beam of electrons. A conventional electron beam source means is disposed within the evacuated envelope and is adapted to deliver a beam of electrons along a path toward the target electrode. Means are provided to cause the beam to be rotated, preferably through 360 degrees, and additional means are provided to bend the beam so as to cause it to travel radially outward adjacent one of the fluorescent coatings of the target. An electrostatic deflection means is provided to cause the beam to bend completely around the edge of the target electrode so the beam will travel along a path adjacent the other fluorescent coating of the target electrode. Finally, there is provided two sets of deflection means disposed in spaced and substantially parallel relation with the fluorescent coatings, one set for each coating. The deflection sets may be selectively energized to cause the beam to be deflected toward and impinge upon the desired fluorescent surface.

Figure 2:
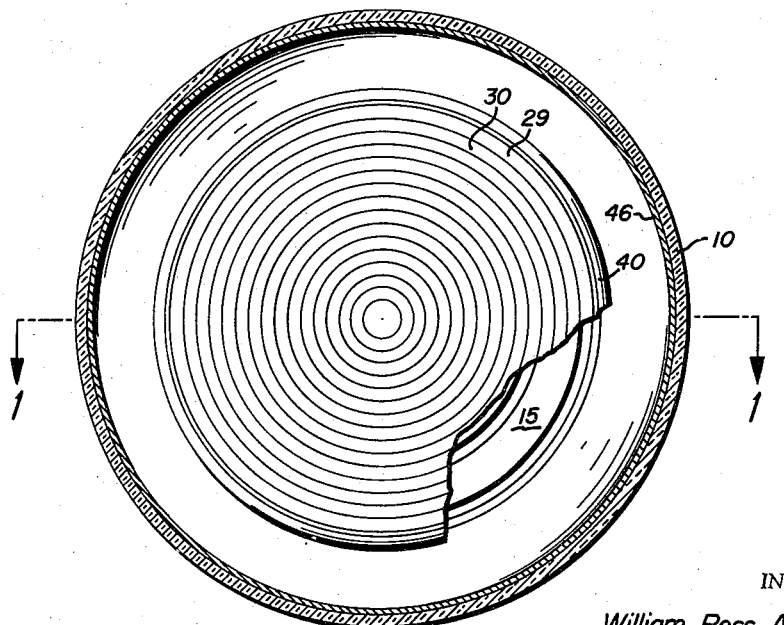
Figure 3:
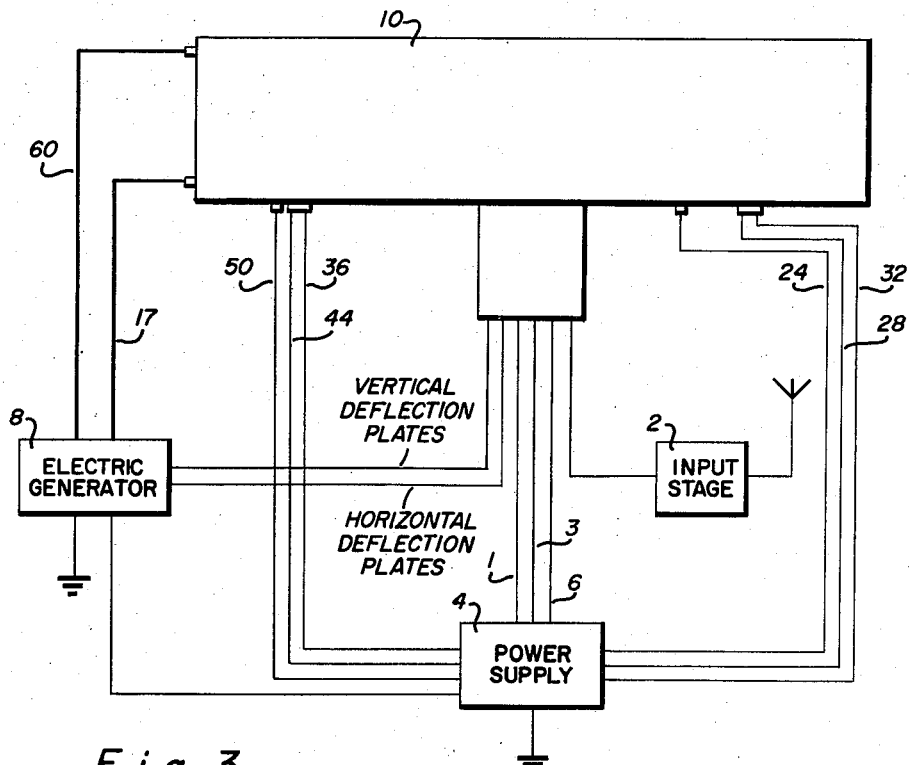
Figure 4:
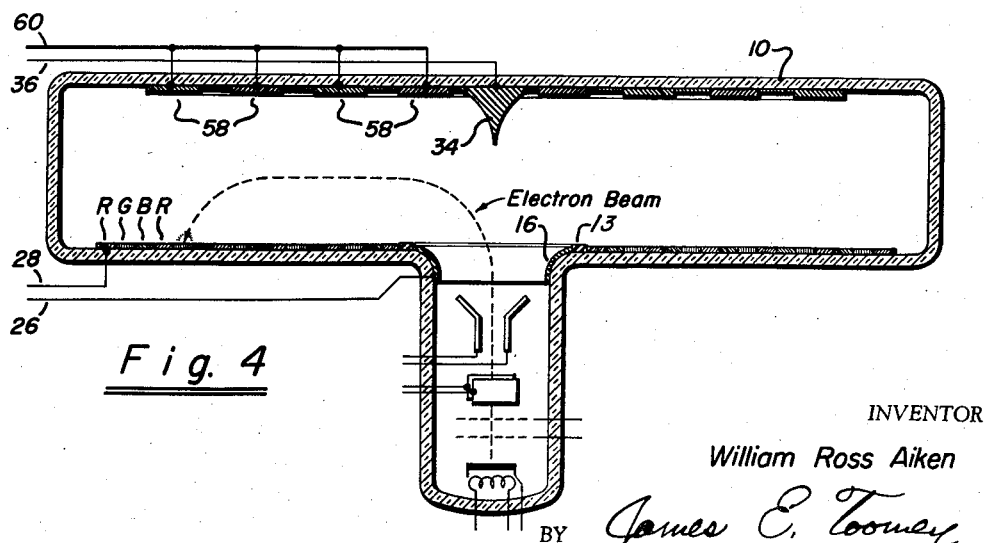
Figure 5:
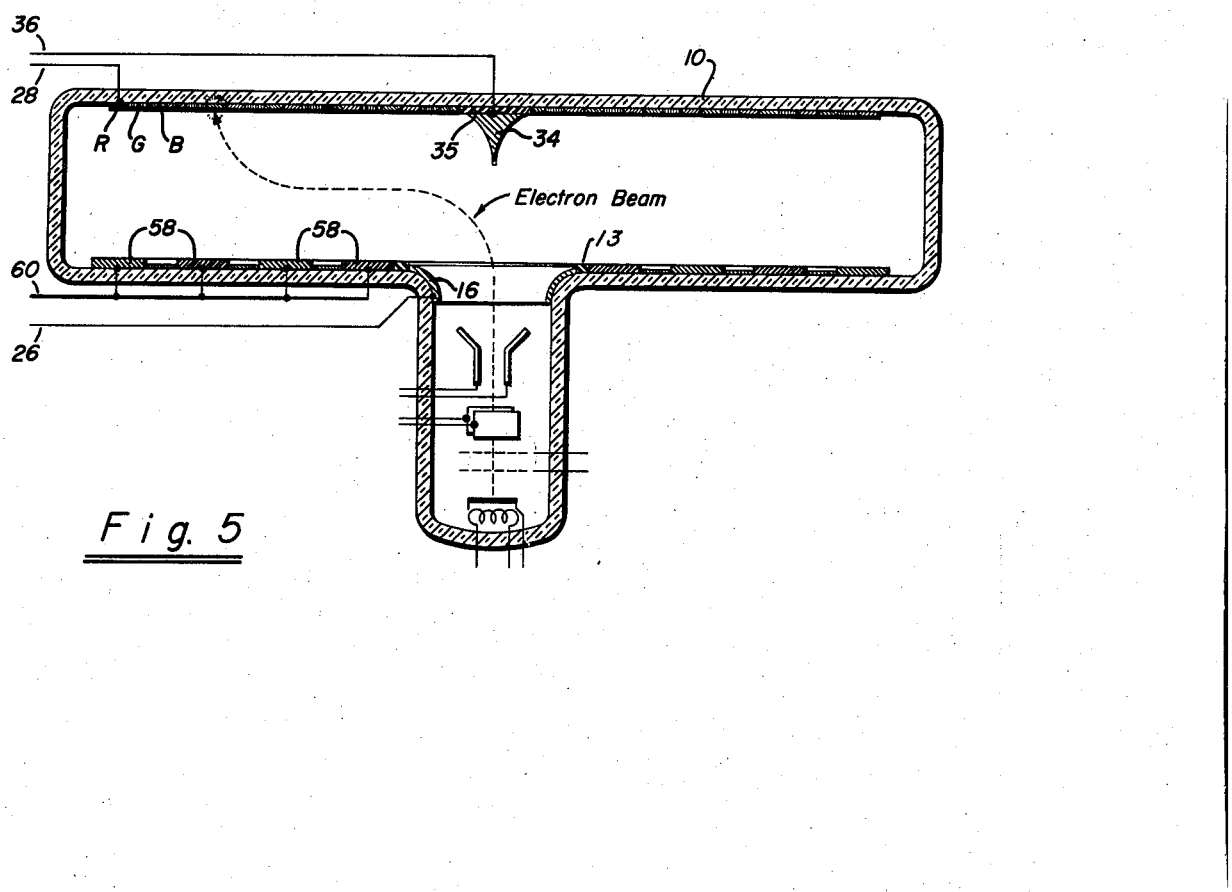

The specific features and advantages will be readily apparent when the following description is read in conjunction with the associated drawings in which:

Figure 1 is a sectional view of the tube showing various electrical connections schematically, Figure 2 is a sectional view of the tube taken along line 2—2 of Figure 1 with a portion broken away to more clearly disclose the invention, Figure 3 is a block diagram of a system incorporating the polar coordinate tube of the instant invention, Figure 4 is a sectional view of a modified version of the tube shown in Figure 1, and Figure 5 is a sectional view of a tube similar to the one shown in Figure 4 except the target and deflection annuli are reversed.

Referring to Figures 1 and 2, disposed within an evacuated envelope 10, there is arranged a heater filament 1, cathode 3, a control electrode 5, and accelerating electrode 6, a pair of horizontal deflection plates 7, and a pair of vertical deflection plates 9 which as an assembly comprises a conventional electron gun arrangement for producing and delivering a beam of electrons. The horizontal deflection plates 7 and the vertical deflection plates 9 are suitably energized by an electric generator 8 as vn in Figures 1 and 3. The filament 1, cathode 3, and lerating electrode 6 are suitably energized from a er supply 4, as shown in Figures 1 and 3.

n apertured non-conductive plate 14 is disposed with- 1e enlarged portion of the envelope 10, positioned sversely with respect to the emergent electron beam which is formed and delivered by the aforemen- d electron gun assembly. A plurality of annular ction electrodes 15 are fixed to the surface of the 14 and electrically connected to electric generator 8 plurality of conductors 17 which pass through a um tight seal in the wall of the envelope 10. An lar electrode 16 is disposed within the aperture ed in the plate 14 and is insulatingly spaced from nnermost of the annular deflection electrodes 15 by insulating properties of the plate 14 and annular ator ring 13. The electrode 16 is energized through lectrical conductor 24 which in turn is connected to note power supply outside the tube envelope through uum tight seal 26. The plate 14 is maintained in a vely fixed position within the tube envelope 10 by fixedly adhered to the hollow insulating rods 20 and any suitable manner.

optically transparent target plate 30 is positioned n the envelope 10 in spaced relation from and sub- ially parallel to the plate 14. In order to maintain paced relation between the plate 30 and the plate he plate 30 is disposed and fixedly adhered to the nal portions of the insulating rods 20 and 22. e plate 30 is provided with two fluorescent coatings d B, one on one surface of the plate and one on the . The coating A is comprised of a plurality of ar concentric strips 29 and 31 of transparent fluo- nt material which will, when excited by a beam of ons, emit red and blue light respectively. The coat- is formed of a single coating 38 of transparent fluo- nt material which will emit green light when excited eam of electrons. The coatings A and B are main- l at the desired potential by a preferably remote r supply through electrical conductors 28 and 32 ctively. These conductors are adapted to pass from utside through the envelope wall and then may be d within the hollow central portion of the insulat- d 20.

electrode 34 is mounted on the surface of the 30 which is facing the electron beam source and rgized through a conductor 36 which in turn is cted to a power supply 4 outside the tube envelope ough the hollow portion of the insulating rod 22. sulating member 35 is disposed intermediate the de 34 and the surface of the target plate 30 to ly insulate the electrode 34.

annular electrode 40 is affixed to the periphery of ate 30 and insulated therefrom by an insulating an- 42. The electrode 40 is energized from a power 4 located outside the tube envelope by means of ctrical conductor 44 which passes through the hol- ortion of the insulating rod 22.

annular electrode 46 is disposed within the tube pe 10 and circumferentially spaced from the elec- 40. The electrode 46 is semi-circular in cross-sec- nd concentric with the electrode 40. The free eral edges of the electrode 46 are insulatingly to the peripheral edge of the plate 14 by an insu- annulus 48. Potential is applied to the electrode ough an electrical conductor 50 from a power sup- located outside the tube wall. The conductor 50 ted to pass through the tube wall through a vacu- ht seal 52.

ansparent disc 54 is positioned within the envelope paced relation with the plate 30 and has its periph- lge affixed to the free peripheral edges of the elec- 46 by an insulating annulus 56. A plurality of r optically transparent electrostatic deflection elec- 58 are affixed to the surface of the transparent disc 54 which faces the plate 30. Potential is applied to the electrodes 58 from an electric generator 8 outside the tube wall through electrical conductors 60 which pass through the wall of the envelope 10.

Figure 3 shows in diagrammatic form a system which incorporates the polar coordinate tube of the instant invention. It will be noted that an incoming signal is received by an antenna and fed through an input stage 2 to the control grid 5 of the electron gun.

A power supply 4 is provided to supply a potential to the various electrodes of the instant device through their respective electrical conductors. Also, it will be noted that the power supply 4 is adapted to energize the electrical generator 8 which in turn is electrically coupled to the horizontal and vertical deflection plates 7 and 9, respectively, of the electron gun. Electric generator 8 is further adapted to supply the desired energization to the transparent deflection electrodes 58 through electrical conductors and the deflection electrodes 15 over electrical conductors 17.

In operation, the electron beam 12 is formed and caused to pass through the electrostatic field established by the horizontal and vertical deflection plates 7 and 9, respectively. By applying suitable varying potentials to these deflection electrodes, a rotating electrostatic field is established which causes the electron beam 12 to rotate about its longitudinal axis. It will be readily discernible that the beam 12 could also be caused to rotate about its longitudinal axis by other means, such as, for example, an electromagnetic means rotatably mounted around the neck of the envelope which, in the case of radar use, could be rotated in synchronism with the antenna.

Suitable potentials are impressed on the electrodes 16 and 34 thereby establishing electrostatic field conditions to cause the electron beam 12 to bend through substantially 90 degrees and travel in a path radially outward therefrom. It will be discerned that the electrode 16 must have a potential impressed thereon which is positive with respect to the beam or the cathode potential and the potential impressed upon the electrode 34 must be negative with respect to the beam or cathode potential, thereby causing the beam to bend through substantially 90 degrees and travel along a radial path intermediate the plate 14 and the plate 30.

For purposes of illustration, it will be assumed that the first signal to be displayed by the tube is to be red, in which case, the electron beam 12 must impinge upon the annular strips 29 of the coating A. A field-free region is established between the coating B and its associated set of deflection electrodes 15, so that the beam 12 will not be affected by any spurious electric fields which would otherwise interfere with and adversely affect the beam travel. In order to establish the desired field-free region, the potentials impressed on the set of deflection electrodes 15 must be substantially equal to the potential impressed on the coating B comprised of the fluorescent material 38. Accordingly, the electron beam 12 will now travel radially outwardly and away from the electrode 16 and 34, between and substantially parallel to the plate 30 and the set of deflection electrodes 15.

The electrodes 40 and 46 cooperate together to form an electron lens arrangement adapted to bend or deflect the electron beam 12 through substantially 180 degrees and cause the beam to travel along a path intermediate the fluorescent coating A on the target plate 30 and the set of deflection electrodes 58. A suitable negative potential with respect to the beam potential is applied to the electrode 46 and a likewise suitable positive potential with respect to the beam potential is applied to the electrode 40 to effect the desired beam bend or deflection. The energy and forward velocity of the electron beam 12 is sufficient to cause the beam to traverse the entire radius of the target plate 30 and due to the rotation effected thereon by the rotating electrostatic field, the beam will be caused to rotate or sweep through 360 degrees in a plane parallel to that of the target. It will now be seen that the beam has been caused to bend and travel along a path which is intermediate the fluorescent coating A and the deflection set comprised of the electrodes 58. In order to cause the beam to be deflected toward and impinge upon the fluorescent material of the annular strips 29, suitable one or ones of the deflection set 58 are selectively driven in a negative direction by the electric generator 8. As the beam 12 sees the negative going field, which becomes less positive with respect to the cathode potential of the electron source, established by the deflection electrodes 58, it will be thereby deflected in a direction toward and impinge upon only the annular strip 29 of the fluorescent coating A. The impinging electrons will cause the fluorescent material of this coating to become excited and give off a luminescent signal in the form of red light in the example presently under discussion. The resulting luminescence may then be effectively viewed from a point outside the tube 10 through the transparent deflection electrodes 58 and the transparent disc 54.

Next, it will be assumed that the signal to be displayed is to be green, in which case the beam must be caused to impinge on the fluorescent material 38 which is capable of emitting green light. In this case, the electron beam 12, still under the influence of the rotating electrostatic field established by the horizontal and vertical deflection plates 7 and 9, respectively, of the electron gun, is caused to be deflected from its initial path by the electron lens comprised of the electrodes 16 and 34 and travel along a path which is intermediate the fluorescent coating B and the set of deflection electrodes 15. In order to cause the electron beam 12 to impinge upon the fluorescent material 38 of the coating B, certain one or ones of the deflection set comprised of the electrodes 15 must be driven less positive with respect to the cathode potential of the electron gun thereby establishing a repelling electrostatic field which will cause the beam to be deflected toward and impinge upon the fluorescent material 38 which, upon electron bombardment, will exhibit a green luminescent signal. This green signal or light may be readily viewed from a point outside the tube wall through the transparent plate or disc 54, transparent deflection electrodes 58, and the transparent disc or plate 30. The next signal to be displayed may be the blue signal which is accomplished in substantially the same fashion as in the case of the red signal as described hereinbefore. In order to effectively obtain a blue raster, it will be readily apparent that the electron beam 12 must be caused to impinge upon only the annular strips 31 which when excited by electron bombardment will emit blue light.

It will be apparent to those skilled in the art that if the signals corresponding to the red and green information is received with rapidity, the spots where the electron beam impinges on the superimposed targets may exhibit a resultant visual color signal which is a blend of the colors exhibited by the individual target areas.

Assuming that a raster is desired of a solid or single color, the system may be energized in such a manner as to cause the beam to impinge only one of the fluorescent surfaces of the target plate 30 in which case the other fluorescent coating and associated deflection set would remain inoperative during this period. Let us assume, for example, that a red raster is desired. The electron beam will be caused to be delivered by the electron gun and deflected by the electrodes 16 and 34 and the electrodes 40 and 46 to the region intermediate the deflection plates 58 and the fluorescent coating A, in the manner described hereinabove. As the beam 12 reaches the proximity of the central portion of the fluorescent coating A, a signal is applied to the innermost annular transparent electrode 58 which establishes a less positive field with respect to the cathode potential of the electron source in the center region of the target, and causes the beam to be deflected toward and impinge upon the innermost annular strip 29 of the fluorescent coating A. The impinging electrons will cause the fluorescent material thereof to become excited and give off the desired luminescent signal in the form of red light. Deflection electrodes 58 are then selectively energized to control the electron beam to strike, in succession, the alternate concentric strips 29 of the target to effect the provision of a solid red raster. Although the negative going potential may be initially applied to the outermost of the deflection electrodes 58, in actual practice, the potentials are preferably successively or selectively applied to the deflection electrodes by an electric generator in a manner to cause the electron beam to be deflected and impinge on radial portions of the target successively away from its center, thereby effecting excitation of the phosphor on substantially every portion of the fluorescent area of the coating A. When complete scanning of the target has been accomplished, the deflection electrodes are recharged by auxiliary means so that the beam may once again travel to the center portion of the target A and commence another scanning operation.

It must be understood that various modifications of the device will be apparent to those skilled in the art without avoiding the spirit of the instant invention. Such modifications, for example, contemplate the employment of a pair of electron guns each modulated by a signal representing a discrete color. Also, the color emitting properties of the electron sensitive material employed as the targets may be varied within the scope and spirit of the instant invention. These modifications are manifestly few in number, and are only set forth herein by way of example and it is not intended that the invention should be in any way limited thereby.

Figure 4 shows in diagrammatic form a modification of the instant invention wherein the various fluorescent materials of different light emitting properties are applied directly to the inner surface of the enclosing envelope.

It will be noted that the glass envelope 10 employed is substantially identical with that shown in Figures 1 and 2. The electron gun assembly is identical with the one shown and described in connection with Figures 1 and 2. The fluorescent target is comprised of annular strips R, B and G which are capable of emitting red, blue, and green light, respectively, when bombarded by a beam of electrons. These strips R, B and G are applied directly to the inner surface of the envelope 10 and may be maintained at the desired potential value by running electrical conductors through the envelope 10 to a power supply in any of the methods well known in the art.

The electrode 16 may be applied directly to the inner surface of the reduced neck portion of the envelope 10 which is shaped to have the desired geometry. The material used to form the electrode 16 may be of any of the electrically conducting materials. It has been found that tin oxide films are suitable for this purpose and provide a material which may be applied readily and has satisfactory electrical conducting properties.

The electrode 34, which is provided to operate in conjunction with the electrode 16 to constitute an electron lens arrangement, is adapted to be suitably affixed to the inner surface of the envelope 10 opposite the surface on which the fluorescent target is formed. A conventional electrical conductor 36 may be employed to properly energize the electrode.

A plurality of concentric deflection electrodes 58 are formed on the same surface of the envelope 10 as the electrode 34. In this particular arrangement, it is a paramount necessity that the electrodes 58 to optically transparent in order that the information displayed on the fluorescent target may be visually observed from a point outside of the tube. Satisfactory results have been achieved by employing tin oxide for the material comprising the deflection electrodes 58 and painting the material on the inner surface of the envelope 10. Electrical conductors 60 are employed to couple the deflection electrode 58 to a remote electric generator.

It has been found advantageous to apply a coating 59 of material having a high electrical resistance property, such as for example tin oxide, between the adjacent deflection electrodes 58. This coating may be made optically transparent and while providing an insulating media between the individual deflection electrodes 58, also provides a leakage path for any charge which might accumulate thereon and which would otherwise tend to establish undesirable spurious electric fields.

The operation of the modification shown in Figure 4 is substantially identical with that shown and described in connection with Figures 1 and 2 with the exception that the fluorescent target area lies all within a single plane necessitating only a single 90 degree deflection of the beam to excite the target after it has been initially deflected or bent by the electron lens arrangement comprised of the electrodes 16 and 34.

Another modification of the tube comprising the invention is shown in Figure 5 wherein the elements are identical with those shown and described in connection with Figure 4. It will be readily apparent that the only change incorporated in the modified version of Figure 5 is a transposition of the target screen comprised of the annular strips R, G and B of fluorescent material and the annular deflection electrodes 58. The operation of the device remains substantially the same.

For the purposes of illustration only the additive primary color system has been mentioned in connection with the fluorescent materials chosen which in combination will blend together a form of polychromatic replica of the transmitted pictorial data. It must be understood that other fluorescent materials giving off light other than red, blue, and green may be satisfactorily employed in practicing the instant invention.

According to the provisions of the patent statutes, I have explained the principles and mode of operation of my invention, and have illustrated and described what I now consider to represent its best embodiment. However, I desired to have it understood that, within the scope of the appended claims, the invention may be practiced otherwise than as specifically illustrated and described.

What is claimed is:

1. A polar coordinate cathode ray tube for exhibiting multi-color displays comprising a target, said target having at least one surface coated with a plurality of sets of annuli of fluorescent material arranged in a predetermined pattern, certain of said annuli of each set having different color emitting properties than other of said annuli in the set, the annuli of each set of said plurality being arranged in the same pattern, electron beam source means arranged to deliver a beam along a path generally parallel to said surface of said target, and deflection means for selectively deflecting said beam from said path into registration with different ones of said annuli.

2. A polar coordinate cathode ray tube for providing polychromatic image presentations comprising a target, said target having at least one surface thereof coated with a plurality of sets of annular strips of fluorescent material arranged in a predetermined pattern, certain of said annular strips in each set having different color emitting properties than others of the strips in the set, the annular strips of each set of said plurality being arranged in the same pattern, an electron beam source means for sweeping a beam through a zone in substantially parallel relation with respect to the annular strips on said target surface, and deflection means for selectively applying deflecting forces to said beam to deflect same from said zone into registration with selective ones of said strips.

3. A polar coordinate cathode ray tube for displaying information in color comprising a target having one surface coated with a material capable of emitting light of one color upon electron bombardment and the opposite surface coated with a plurality of sets of annular strips of material capable of emitting light of at least two different colors upon electron bombardment, the color strips of the different sets being spaced in the same pattern, an electron beam source means for delivering a beam of electrons along a path toward said target, deflecting means for bending the beam from said path to a path adjacent each of the surfaces of said target, and deflection means in adjacent spaced relation with respect to each of of said surfaces for applying deflecting forces to the beam along said path causing the same to impinge selectively on desired points of said target surfaces.

4. A polar coordinate cathode ray tube for providing polychromatic image presentations comprising an envelope, a target including a plurality of sets of concentric annular strips of electron sensitive material arranged in a predetermined pattern on an inner surface of said envelope, certain of said annular strips in each set having different color emitting properties than other of said strips in the set, the strips of each set of said plurality being arranged in the same pattern, an electron beam source means for delivering a beam through a zone in substantially parallel relation with respect to said target surface, and a set of annular deflection elements disposed on a second inner surface of said envelope for selectively applying deflecting forces to said beam to selectively deflect the beam from said zone into registration with different ones of said strips.

5. A polar coordinate cathode ray tube for providing polychromatic image presentations comprising a target, said target having at least one surface thereof coated with a plurality of sets of annular strips of fluorescent material arranged in a predetermined pattern, certain of said annular strips in each set having different color emitting properties than other of said strips in the set, the strips of each set of said plurality being arranged in the same pattern, an electron beam source means for delivering a beam along a first path in a direction substantially normal to said target, means for deflecting the beam from said path to a subsequent path which extends in substantially parallel relation with respect to said one target surface, and deflection means for selectively applying deflecting forces to said beam to deflect same from said subsequent path into registration with selective points on said target fluorescent material.

6. A cathode ray tube for exhibiting displays in color comprising a target including a plurality of sets of concentric annular strips of electron sensitive material arranged in a predetermined pattern on a surface of said target, certain of said strips in each set having different color emitting properties than other of said strips in the set, the strips of each set of said plurality being arranged in the same pattern, an electron beam source means for delivering a beam in substantially parallel relation with respect to said target surface, and a set of annular deflection elements disposed along said path for applying deflecting forces to said beam to deflect same from different points along said path into selective registration with correspondingly different ones of said strips.

References Cited in the file of this patent
UNITED STATES PATENTS

| 2,617,876 | Rose | Nov. 11, 1952 |
| 2,806,969 | Williams et al. | Sept. 17, 1957 |
| 2,809,324 | Shanafelt | Oct. 8, 1957 |